United States Patent Office 2,904,561
Patented Sept. 15, 1959

2,904,561
1-ACYLTHIO-4-PREGNENE-3,20-DIONES

Raymond M. Dodson, Park Ridge, and Robert C. Tweit, Wilmette, Ill., assignors to G. D. Searle & Co., Chicago, Ill., a corporation of Delaware No Drawing. Application May 2, 1958
Serial No. 732,454

4 Claims. (Cl. 260—397.3)

The present invention is concerned with 1α-acylthio substitution products of 4-pregene-3,20-diones. The compositions of this invention can be represented by the general structural formula

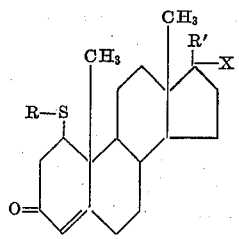

wherein R is a (lower)alkanoyl radical, R' is a member of the group of radicals consisting of acetyl, hydroxyacetyl and (lower)alkanoyloxyacetyl and X is a member of the group of radicals consisting of hydrogen and hydroxyl. Among the (lower)alkanoyl radicals comprehended by the term (lower)alkanoyl are formyl acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms. Compositions of the present invention can be prepared by the addition of a thioalkanoic acid of the structural formula

R"COSH wherein R" represents hydrogen or a lower alkyl radical, to a 1,4-pregnadiene-3,20-dione which has the structural formula

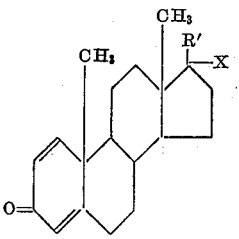

wherein R' and X have the means as aforesaid. The addition reaction to the 1,2-double bond proceeds fairly rapidly at elevated temperatures, such as those in excess of 50°, and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100°. Heating periods of up to a few hours are sufficient to achieve substantial conversion to the desired reaction products. Typically, the desired compound is obtained in a satisfactory state of purity by direct filtration of the cooled reaction mixture, preceded, where necessary, by removal of excess thioalkanoic acid. If desired, however, the reaction product can be purified by chromatographic techniques using adsorbents such as silica gel followed by elution with mixtures of ethyl acetate and benzene.

When the compound desired is one having an esterified hydroxyl group at position 21, it is suitable to employ as starting material the corresponding 21-ester of a 21-hydroxy-1,4-pregnadiene-3,20-dione; or alternatively, to carry out the addition reaction on the derivative having a free 21-hydroxyl group, and subsequently to complete the partial acylation effected by the thioalkanoic acid by adding pyridine and a lower alkanoic acid anhydride of the same kind to the reaction mixture prior to the isolation of the product.

When the final product desired is one having a free 21-hydroxyl group, it can be obtained by the treatment of the corresponding 21-hydroxy-1,4-pregnadiene-3,20-dione, suitably in an inert solvent, with only one molecular equivalent of the thioalkanoic acid. It can be obtained also by treating the free 21-hydroxy-1,4-pregnadiene derivative with an excess of the thioalkanoic acid, but under milder conditions, such as by the use of a shorter reaction time. The quantity of 21-ester which does form by the acylating action of the thioalkanoic acid is then removed by chromatography.

The addition of thioalkanoic acids to the 1,2-double bond of the starting materials employed in the practice of this invention proceeds under steric influences such that of the stereoisomers formed, one is obtained in predominant amount. The isomer obtained in predominant amount has in each case been characterized herein as possessing the α-configuration of the 1-acylthio group. This configuration has been designated in order to provide a more complete exposition of the present invention, and in order that the specification shall constitute a more useful contribution to the art. However, the designated configuration of the 1-acylthio group is based upon an analysis of the molecular rotation data presently appearing in the chemical literature, and is therefore not to be interpreted except in relation to the state of the art presently known to organic chemists. It will be apparent that no part of the specification will be materially defective if it should be established later that the configuration is the opposite of that deducible from data presently available to workers in the field.

The compounds of the invention have useful pharmacological properties. They are hormonal agents of the luteoid and adrenocorticoid types, more specifically progestational agents and anti-inflammatory and neoglycogenetic agents of the cortisone type.

This invention will appear more fully from the examples which follow. These examples are set forth by way of illustration only and it will be understood that the invention is not to be construed as limited in spirit or in scope by the details contained therein, as many modifications in materials and in methods will be apparent from this disclosure to those skilled in the art. In these examples, temperatures are given in degrees centigrade (° C.) and quantities of materials are expressed in parts by weight and parts by volume which bear the same relation one to the other as kilograms to liters.

Example 1

A mixture of 2.0 parts by weight of 1-dehydroprogesterone and 1 part by volume of thioacetic acid is heated and irradiated with ultraviolet light for one and one-half hours. To the mixture is added 10 parts by volume of benzene and the resulting solution concentrated under vacuum. The residue is stirred with ether and the solid which forms is collected and washed with a little ether to yield 1α-acetylthioprogesterone; melting point 147.5–149°; specific rotation +212.5° (chloroform); ultraviolet maximum at 241 mμ with extinction coefficient 16,300.

Example 2

A solution of 2.82 parts by weight of 21-acetoxy-17α-hydroxy-1,4-pregnadiene-3,20-dione and 2 parts by volume of thioacetic acid is heated and irradiated with ultraviolet light. The reaction mixture is concentrated to one-half volume in vacuo, cooled and diluted with ether. The solid precipitate which forms is collected and recrystallized from acetone to yield 21-acetoxy-1α-acetylthio-17α-hydroxy-4-pregnene-3,20-dione; melting point 202–204° (dec.); specific rotation +149.5° (chloroform).

Example 3

A mixture of 0.65 part by weight of 17α,21-dihydroxy-1,4-pregnadiene-3,11,20-trione 21-ethylcarbonate and 0.6 part by volume of thioacetic acid is refluxed for 3 hours while irradiating with ultraviolet light. On standing overnight a solid residue forms. Part of the excess thioacetic acid is removed under vacuo and the solid residue is collected, washed with ether and crystallized twice from acetone to yield 1α-acetylthio-21-ethylcarbonyldioxy-17α-hydroxy-4-pregnene-3,11,20-trione; melting point 202.5–205° (dec.); specific rotation +174° (chloroform).

Example 4

A mixture of 4.49 parts by weight of 21-acetoxy-1,4-pregnadiene-3,20-dione and 3 parts by volume of thioacetic acid is refluxed for 2 hours while irradiating with ultraviolet light and then allowed to stand overnight. The mixture is concentrated in vacuo to one-half volume, cooled and the residue collected, dissolved in acetone, filtered and the acetone evaporated. The residue is dissolved in 50 parts by volume of benzene and chromatographed on 200 parts by weight of silica gel. The column is eluted with 5000 parts by volume of 5% ethyl acetate in benzene followed by 1500 parts by volume of 10% ethyl acetate in benzene. The eluates are combined, the solvent removed and the residue crystallized from methylene chloride-ether to yield 21-acetoxy-1α-acetylthio-4-pregnene-3,20-dione; melting point 149–150°; specific rotation +193° (chloroform); ultraviolet maximum at 241 mμ, with an extinction coefficient 17,300.

Example 5

A mixture of one part by weight of 21-hydroxy-1α-propionlythio-4-pregnene-3,20-dione, 4 parts by volume of isobutyric anhydride and 8 parts by volume of pyridine is warmed on the steam bath until homogeneous. The solution is allowed to stand overnight, diluted with water and extracted with methylene chloride. The methylene chloride solution is washed with sodium carbonate solution and concentrated in vacuo. The residue is dissolved in 50 parts by volume of benzene and chromatographed on silica gel. The chromatographic column is washed with 2000 parts by volume of benzene and eluted with 3000 parts by volume of 5% ethyl acetate in benzene. The solvents are removed from the eluate leaving 21-isobutyroxy-1α-propionylthio-4-pregnene-3,20-dione which exhibits a maximum in the ultraviolet absorption spectrum at 241 millimicrons and absorption maxima in the infrared at 5.7, 5.8, 5.95, 6.2 and 10.7 microns.

Example 6

A mixture of 1.5 parts by weight of 21-hydroxy-1,4-pregnadiene-3,20-dione and 1.5 parts by volume of thiopropionic acid is heated for 20 minutes on the steam bath. Then 10 parts by volume of benzene is added and the solution chromatographed on 120 parts by weight of silica gel. The chromatographic column is washed with 2000 parts by volume of benzene and eluted with 5000 parts by volume of 5% ethyl acetate in benzene. The solvents are removed from the eluate in vacuo to yield 21-propionoxy-1α-propionylthio-4-pregnene-3,20-dione as a glass which exhibits maxima in the ultraviolet spectrum at 240 millimicrons and in the infrared absorption spectrum at 5.71, 5.78, 5.95, 6.19, 6.82, 7.03, 7.25, 7.84, 8.5, 9.17, 9.8 and 10.7 microns.

The chromatographic column is eluted a second time with 4000 parts by volume of 15% ethyl acetate in benzene, the solvents are removed from the eluate in vacuo to yield 21-hydroxy-1α-propionylthio-4-pregnene-3,20-dione which melts at 160–161° and exhibits maxima in the ultraviolet absorption spectrum at 241 millimicrons and in the infrared absorption spectrum at 2.82, 5.95, 6.18, 6.85, 7.02, 7.18, 7.39, 7.82, 8.20, 9.17, 9.36, 9.8 and 10.7 microns.

What is claimed is:
1. A compound of the formula

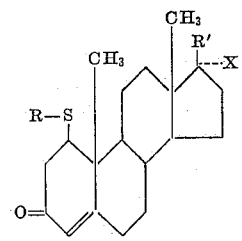

wherein R is the (lower)alkanoyl radical, R' is a member of the group of radicals consisting of acetyl, hydroxyacetyl and (lower)alkanoyloxyacetyl and X is a member of the group of radicals consisting of hydrogen and hydroxyl.

2. 1α-acetylthio-4-pregnene-3,20-dione.

3. 1α - acetylthio - 21 - acetoxy - 17α - hydroxy - 4-pregnene-3,20-dione.

4. 1α - acetylthio 21 - acetoxy - 4 - pregnene - 3,20-dione.

No references cited.